(12) United States Patent
Chae

(10) Patent No.: US 11,768,463 B2
(45) Date of Patent: Sep. 26, 2023

(54) DIGITAL HOLOGRAM DISPLAY APPARATUS AND DISPLAYING METHOD OF DIGITAL HOLOGRAPHIC IMAGE

(71) Applicant: ELECTRONICS AND TELECOMMUNICATIONS RESEARCH INSTITUTE, Daejeon (KR)

(72) Inventor: Byung Gyu Chae, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 534 days.

(21) Appl. No.: 16/912,237

(22) Filed: Jun. 25, 2020

(65) Prior Publication Data

US 2020/0409307 A1  Dec. 31, 2020

(30) Foreign Application Priority Data

Jun. 26, 2019  (KR) .................. 10-2019-0076595
Jul. 10, 2019  (KR) .................. 10-2019-0083427
Jun. 22, 2020  (KR) .................. 10-2020-0075794

(51) Int. Cl.
  *G03H 1/22*  (2006.01)
  *G03H 1/08*  (2006.01)
  *G03H 1/04*  (2006.01)

(52) U.S. Cl.
  CPC .......... *G03H 1/2294* (2013.01); *G03H 1/0443* (2013.01); *G03H 1/0486* (2013.01); *G03H 1/0808* (2013.01); *G03H 2226/02* (2013.01)

(58) Field of Classification Search
  USPC ............................................................. 359/9
  See application file for complete search history.

(56) References Cited

U.S. PATENT DOCUMENTS

| 8,379,079 | B2 | 2/2013 | Kroll et al. | |
| 9,756,317 | B2 | 9/2017 | Kim et al. | |
| 2002/0130820 | A1 | 9/2002 | Sullivan | |
| 2010/0149311 | A1* | 6/2010 | Kroll .................. | G03H 1/0808 348/E13.001 |

(Continued)

FOREIGN PATENT DOCUMENTS

| JP | 2963984 B2 | 10/1999 |
| KR | 10-0555807 B1 | 3/2006 |

(Continued)

OTHER PUBLICATIONS

Jongchan Park et al., "Ultrathin wide-angle large-area digital 3D holographic display using a non-periodic photon sieve," Nature Communications, 2019.

(Continued)

*Primary Examiner* — Jennifer D. Carruth

(57) ABSTRACT

Provided are a method of displaying a digital holographic image and a digital hologram display apparatus, the method including generating and converting a digital hologram, recording the digital hologram in a spatial light modulator, radiating coherent parallel light to the spatial light modulator, removing an aliasing noise image, and implementing a reconstructed image reconstructed by the spatial light modulator.

20 Claims, 10 Drawing Sheets

(56) References Cited

U.S. PATENT DOCUMENTS

| | | | |
|---|---|---|---|
| 2013/0100241 A1* | 4/2013 | Sato | G03H 1/0443 |
| | | | 348/40 |
| 2017/0293259 A1* | 10/2017 | Ochiai | G02B 3/0006 |
| 2019/0204783 A1 | 7/2019 | Kim | |
| 2019/0204784 A1 | 7/2019 | Hong et al. | |

FOREIGN PATENT DOCUMENTS

| | | |
|---|---|---|
| KR | 101489332 B1 | 2/2015 |
| KR | 10-2015-0033501 A | 4/2015 |

OTHER PUBLICATIONS

Chae, "Analysis on angular field of view of holographic image dependent on hologram numerical aperture in holographic display," Optical Engineering, 2020, vol. 59 (3), pp. 035103-1-035103-19.

Chae, "Analysis on image recovery for on-axis digital Fresnel hologram with aliased fringe generated from selfsimilarity of point spread function," Optics Communications, vol. 466, 2020, pp. 1-9.

Hahn et al., "Wide viewing angle dyanamic holographic stereogram with a curved array of spatial light modulators," Optical Society of America, 2008, vol. 16 (16), pp. 12372-12386.

\* cited by examiner

DIGITAL HOLOGRAM DISPLAY APPARATUS AND DISPLAYING METHOD OF DIGITAL HOLOGRAPHIC IMAGE

CROSS-REFERENCE TO RELATED APPLICATIONS

This U.S. non-provisional patent application claims priority under 35 U.S.C. § 119 of Korean Patent Application Nos. 10-2019-0076595, filed on Jun. 26, 2019, 10-2019-0083427, filed on Jul. 10, 2019, and 10-2020-0075794, filed on Jun. 22, 2020 the entire contents of which are hereby incorporated by reference.

BACKGROUND

The present disclosure herein relates to a digital hologram display apparatus and a method of displaying a digital holographic image using the same, and more particularly, to a digital hologram display apparatus which provides an increased viewing angle using a digital hologram with a high numerical aperture and a method of displaying a digital holographic image using the same.

A hologram display apparatus (or a holographic display) is an image device for spatially displaying a three-dimensional holographic image using two-dimensional digital hologram information. However, it is very difficult to reconstruct a sufficiently large holographic image at a wide viewing-angle using current technology. A spatial light modulator (SLM) having a submicrometer pixel size is required in order to reconstruct a holographic image at a wide viewing-angle. Display panels used as hologram display devices at the present time are capable of securing a viewing angle of only about several degrees, for example, about 1-2 degrees. Furthermore, even if a spatial light modulator having a submicrometer pixel size is developed in the future, there is still a limitation of processing a massive amount of hologram data to secure a realistic reconstructed image size. Therefore, it is still difficult to realize holographic displays only by developing high-resolution hologram display devices or using a technology of spatially or temporally multiplexing typical spatial light modulators.

Therefore, researches are carried out to develop hologram display apparatuses capable of increasing a viewing angle of a hologram reconstruction image while efficiently handling hologram image data even with a current data processing technology in order to commercialize holographic displays.

SUMMARY

The present disclosure provides a digital hologram display apparatus providing a wide viewing angle and a method of displaying a holographic image using the same.

The purposes of the present disclosure are not limited to the above-mentioned purposes, and other purposes not mentioned would be clearly understood by those skilled in in the art from the disclosure below.

An embodiment of the inventive concept provides a method of displaying a digital holographic image, including generating and converting a digital hologram, recording the digital hologram in a spatial light modulator, radiating coherent parallel light to the spatial light modulator, removing an aliasing noise image, and implementing a reconstructed image reconstructed by the spatial light modulator.

In an embodiment of the inventive concept, a digital hologram display apparatus includes a digital hologram generation/conversion unit configured to generate and convert a digital hologram, a backlight unit configured to generate coherent parallel light, a spatial light modulator including a plurality of pixels configured to record the digital hologram as an electric signal and reconstruct the digital hologram, a noise image removal unit provided on the spatial light modulator and including a plurality of subpixels configured to remove an aliasing noise image, and an output optical system configured to implement a reconstructed image reconstructed by the spatial light modulator, wherein the coherent parallel light generated by the backlight unit is radiated to the spatial light modulator.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
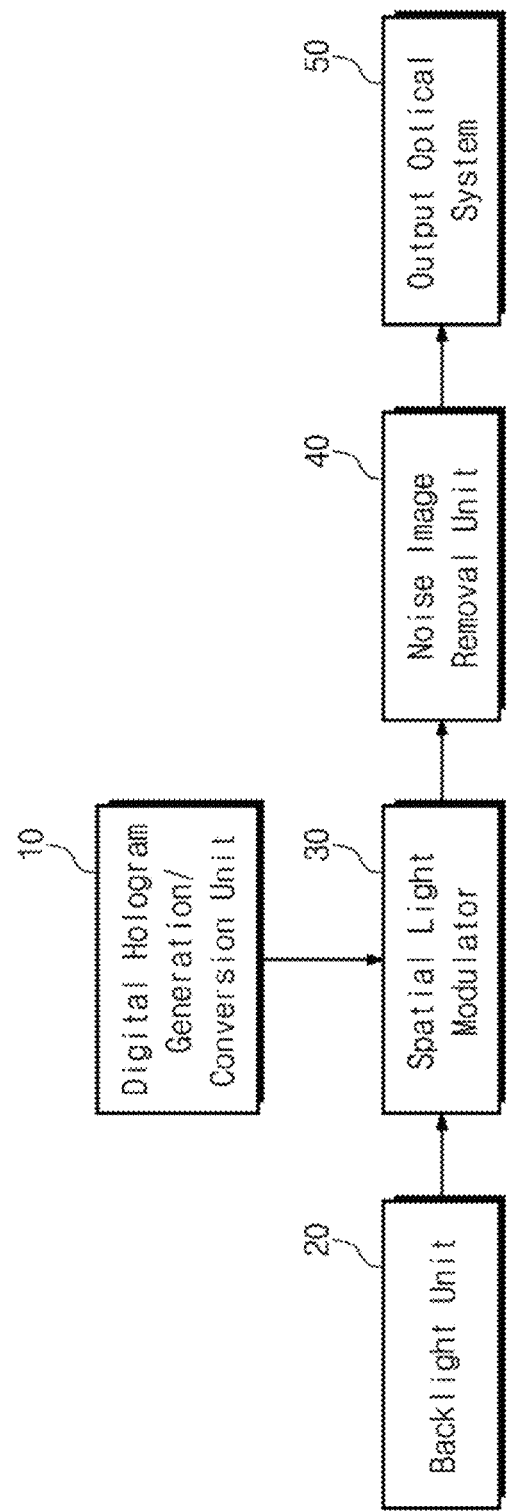
FIG. 1 is a block diagram illustrating a digital hologram display apparatus according to an embodiment of the inventive concept.

Hereinafter, embodiments of the inventive concept will be described with reference to the accompanying drawings so that the configuration and effects of the inventive concept are sufficiently understood.

The inventive concept is not limited to the embodiments described below, but may be implemented in various forms and may allow various changes and modifications. Rather, the embodiments are provided so that this disclosure will be thorough and complete, and will fully convey the scope of the inventive concept to those skilled in the art. In the accompanying drawings, the dimensions of elements are magnified for convenience, and the scale ratios among the elements may be exaggerated or reduced.

The terminology used herein is not for limiting the invention but for describing particular embodiments. Furthermore, the terms used herein may be interpreted as the meanings known in the art unless the terms are defined differently.

The terms of a singular form may include plural forms unless otherwise specified. It will be further understood that the terms "includes", "including", "comprises", and/or "comprising", when used in this description, specify the presence of stated elements, steps, operations, and/or components, but do not preclude the presence or addition of one or more other elements, steps, operations, and/or components.

When a layer is referred to as being "on" another layer, it can be directly on the other layer, or intervening layers may also be present.

The terms "first", "second", and the like are used herein to describe various regions, layers, etc., but these regions or layers should not be limited by these terms. These terms are only used to distinguish one region or layer from another region or layer. Therefore, a part referred to as a first part in an embodiment may be referred to as a second part in another embodiment. The embodiments described herein also include complementary embodiments thereof. Like reference numerals refer to like elements throughout.

Hereinafter, a digital hologram display apparatus and a method of displaying a digital holographic image using the same according to embodiments of the inventive concept will be described in detail with reference to the drawings.

Figure 2A:
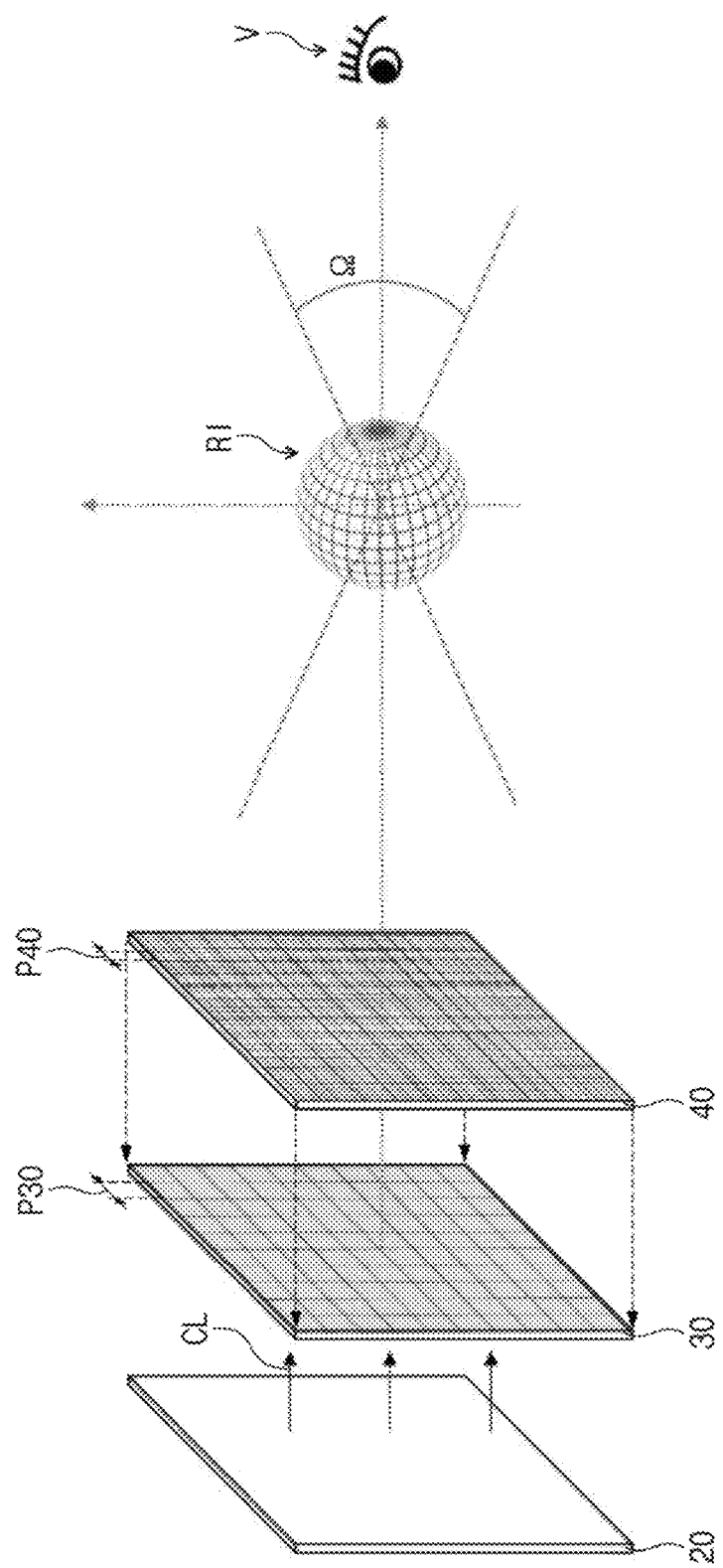
FIGS. 2A and 2B are schematic diagrams for describing a digital hologram display apparatus according to an embodiment of the inventive concept.

FIG. 1 is a block diagram illustrating a digital hologram display apparatus according to an embodiment of the inventive concept. FIG. 2A is a schematic diagram for describing a digital hologram display apparatus according to an embodiment of the inventive concept.

Referring to FIGS. 1 and 2A, a digital hologram display apparatus according to an embodiment of the inventive concept may include a digital hologram generation/conversion unit 10, a backlight unit 20, a spatial light modulator 30, a noise image removal unit 40, an output optical system 50.

The digital hologram generation/conversion unit 10 may generate and convert a digital hologram having a high numerical aperture (NA). The digital hologram generation/conversion unit 10 may generate a digital hologram from an object according to the Huygens-Fresnel principle. The digital hologram may be generated in a Fresnel diffraction regime or Rayleigh-Sommerfeld diffraction regime.

Generation and conversion of a digital hologram by the digital hologram generation/conversion unit 10 may include calculating a digital hologram to be recorded in the spatial light modulator 30. A hologram generated and converted by the digital hologram generation/conversion unit 10 may be referred to as a Fresnel hologram. To calculate a digital hologram, for example, a Riemann integral of a Rayleigh-Sommerfeld formula may be used, according to which the number and size of pixels of an object plane and hologram plane are arbitrarily determined. For another example, a Fresnel formula based on Fourier transformation may be used to calculate a digital hologram. A calculation may be performed at a higher speed when using the Fresnel formula based on Fourier transformation than when using other methods. The Fresnel formula based on Fourier transformation may be calculated with respect to an object plane and a hologram plane having the same number of pixels. When using the Fresnel formula based on Fourier transformation, down-sampling may be further performed after calculating the Fresnel formula based on Fourier transformation. For example, a digital hologram that matches a size of the spatial light modulator 30 may be generated by down-sampling a digital hologram into a size of 256×256 after generating the digital hologram having a size of 512×512 from an object having a size of 512×512.

The digital hologram generation/conversion unit 10 may use a digital image processing sampling technique to generate and convert a digital hologram so as to satisfy a Nyquist-Shannon sampling theorem. The Nyquist-Shannon sampling theorem is a theorem indicating that a signal is required to be sampled at least at twice a highest signal frequency so as to avoid aliasing when sampling the signal. The aliasing represents a waveform distortion phenomenon that may occur when obtaining signals discretely.

The backlight unit 20 may generate coherent parallel light CL using at least one of a plurality of lasers or at least one of a plurality of diodes. For example, the backlight unit 20 may include red, green, and blue lasers. For another example, the backlight unit 20 may include red, green, and blue light-emitting diodes. The backlight unit 20 may irradiate the spatial light modulator 30 with the generated coherent parallel light CL.

The spatial light modulator 30 may have a two-dimensional pixel array structure including a plurality of pixels configured to store a digital hologram as an electric signal and reconstruct the digital hologram. The pixels of the spatial light modulator 30 may have a first pitch P30. For example, each of the pixels of the spatial light modulator 30 may have a square shape. However, this is merely an example, and an embodiment of the inventive concept is not limited thereto, and, thus, each of the pixels of the spatial light modulator 30 may have a rectangular shape, a polygonal shape, and/or an irregular shape.

For example, when the pixels of the spatial light modulator 30 have an irregular shape and an irregular pitch, the noise image removal unit 40 may not be provided on the spatial light modulator 30, and the spatial light modulator 30 may remove a noise image. The noise image may comprise high-order diffraction terms due to a pixelated structure of the spatial light modulator 30. That is, when the spatial light modulator 30 has an aperiodic pixel structure, the spatial light modulator 30 may perform removal of a noise image.

For example, the spatial light modulator 30 may include a liquid crystal display (LCD), liquid crystal on silicon (LCoS), and/or digital micro-mirror device (DMD). The spatial light modulator 30 may modulate the coherent parallel light CL radiated from the backlight unit 20 using a complex-amplitude modulation scheme. However, an embodiment of the inventive concept is not limited thereto, and, thus, the spatial light modulator 30 may modulate the coherent parallel light CL using an amplitude modulation scheme or phase modulation scheme. The spatial light modulator 30 may be spaced apart from the backlight unit 20.

The noise image removal unit 40 may be provided on the spatial light modulator 30. The noise image removal unit 40 may be attached to the spatial light modulator 30 without a separation distance therebetween. The noise image removal unit 40 may be an anti-aliasing filter. An aliasing noise image may be generated due to periodicity of the spatial light modulator 30 having a two-dimensional pixel array structure and a low sampling rate of the spatial light modulator 30.

The noise image removal unit 40 may be a binary amplitude mask having a random distribution. The noise image removal unit 40 may have a two-dimensional pixel array structure including subpixels. For example, each of the subpixels of the noise image removal unit 40 may include an aperture region through which light is transmitted and a boundary region around the aperture region. The boundary region may not transmit light. Each of the subpixels of the noise image removal unit 40 may be disposed at an irregular position which is on corresponding one of the pixels of the spatial light modulator 30. The subpixels of the noise image removal unit 40 may have a second pitch P40. The second pitch P40 may be equal to or smaller than the first pitch P30 of the pixels of the spatial light modulator 30. For example, each of the subpixels of the noise image removal unit 40 may have a square shape. However, this is merely an example, and an embodiment of the inventive concept is not limited thereto, and, thus, each of the subpixels of the noise image removal unit 40 may have a circular shape, a rectangular shape, a polygonal shape, and/or an irregular shape.

The noise image removal unit 40 may remove an aliasing noise image by suppressing high-order diffraction terms.

The output optical system 50 may remove a non-diffracted component and a twin image, and may implement a reconstructed image RI at an appropriate distance. A distance at which the reconstructed image RI is implemented may be defined as a distance from the spatial light modulator 30 to the reconstructed image RI.

Through the digital hologram display apparatus according to an embodiment of the inventive concept, a viewer V may view the reconstructed image RI having a sufficiently large size at a wide viewing angle Ω. The viewing angle Ω may be at least about 10 degrees, more specifically, at least about 30 degrees. The viewing angle Ω, for example, may be from about 10 degrees to about 90 degrees. For example, the size of the reconstructed image RI may be equal or larger than the size of the spatial light modulator 30.

Figure 2B:
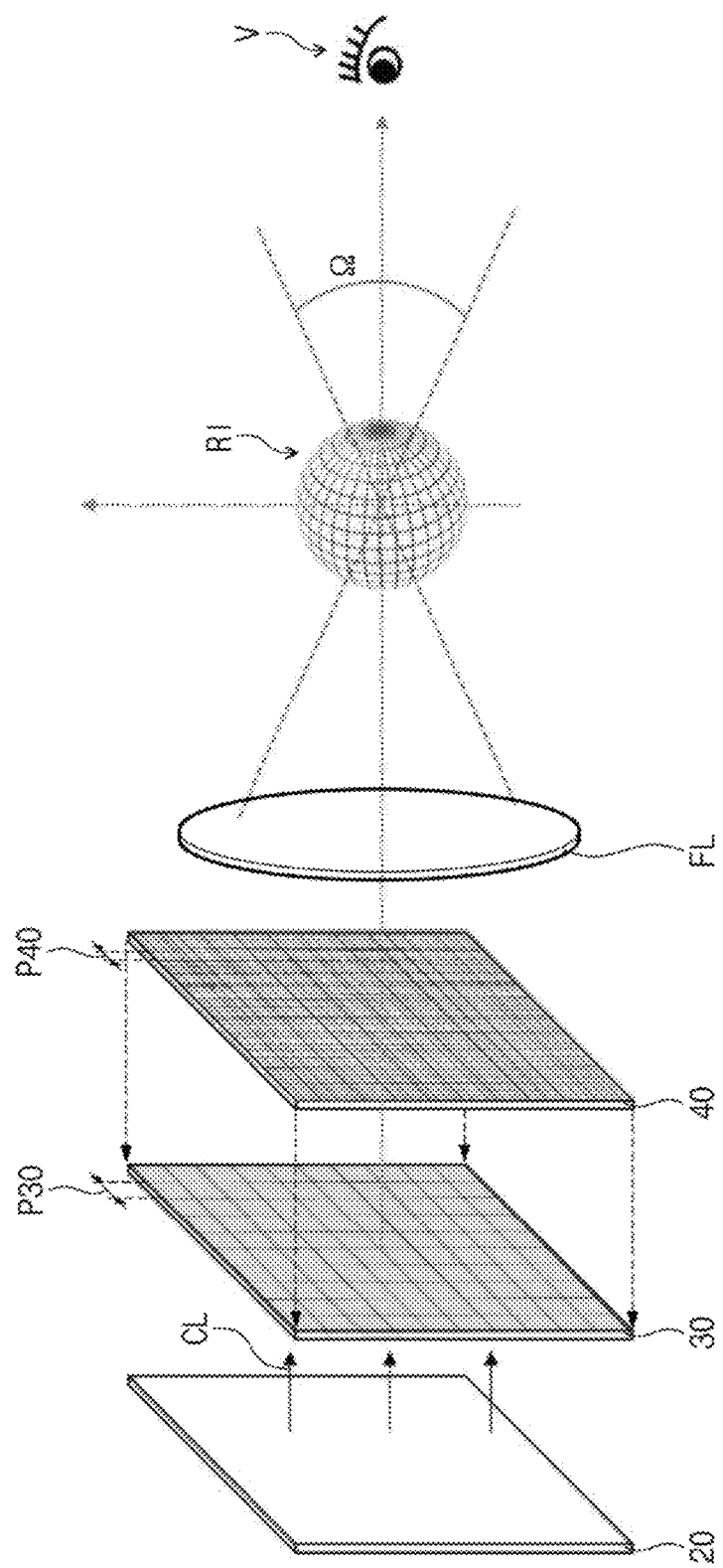

FIG. 2B is a schematic diagram for describing a digital hologram display apparatus according to an embodiment of the inventive concept.

Referring to FIGS. 1 and 2B, a digital hologram display apparatus according to an embodiment of the inventive concept may further include a Fourier lens FL provided between the noise image removal unit 40 and the output optical system 50.

In the digital hologram display apparatus including the Fourier lens FL, the digital hologram generation/conversion unit 10 may use a Fourier hologram synthesis formula to calculate a digital hologram. A hologram generated and converted by the digital hologram generation/conversion unit 10 may be referred to as a Fourier hologram.

Figure 3:
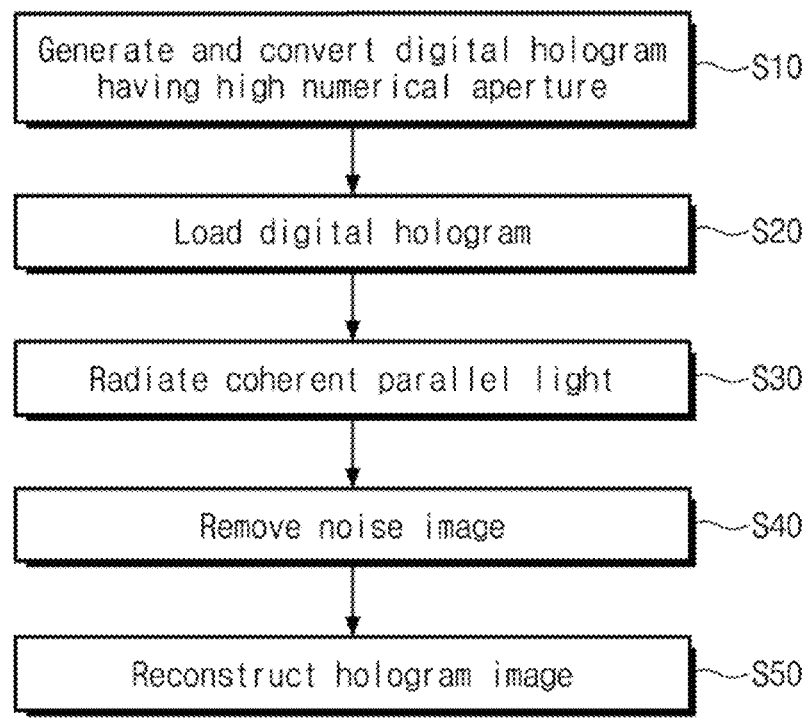
FIG. 3 is a flowchart illustrating a method of displaying a digital holographic image using a digital hologram display apparatus according to an embodiment of the inventive concept.

FIG. 3 is a flowchart illustrating a method of displaying a digital holographic image using a digital hologram display apparatus according to an embodiment of the inventive concept.

Referring to FIGS. 1, 2A, and 3, a method of displaying a digital holographic image using a digital hologram display apparatus according to an embodiment of the inventive concept may include generating and/or converting, by the digital hologram generation/conversion unit 10, a digital hologram having a high numerical aperture (S10), recording the digital hologram in the spatial light modulator 30 (S20), radiating the coherent parallel light CL from the backlight unit 20 to the spatial light modulator 30 (S30), removing an aliasing noise image through the noise image removal unit 40 provided on the spatial light modulator 30 (S40), and reconstructing a hologram image through the output optical system 50 (S50). The reconstructing of the hologram image through the output optical system 50 (S50) may include implementing a reconstructed image reconstructed by the spatial light modulator 30.

However, an embodiment of the inventive concept is not limited thereto, and, thus, the removing of the aliasing noise image (S40) may be performed by the spatial light modulator 30 itself. Here, the digital hologram display apparatus according to an embodiment of the inventive concept may not include the noise image removal unit 40 on the spatial light modulator 30.

Figure 4:
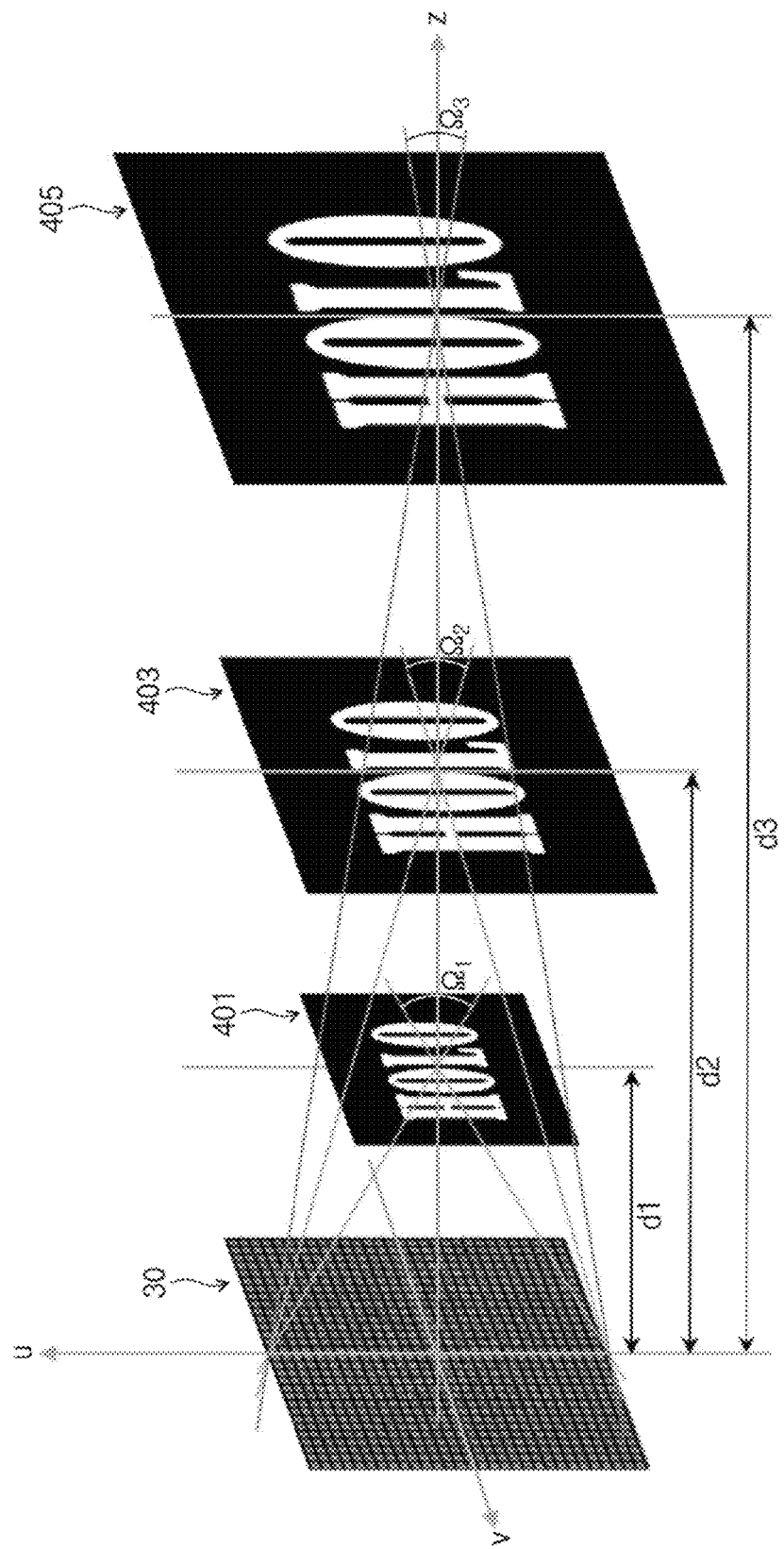
FIG. 4 is a conceptual diagram for describing a digital hologram generated using a digital hologram display apparatus according to an embodiment of the inventive concept.

FIG. 4 is a conceptual diagram for describing a digital hologram generated using a digital hologram display apparatus according to an embodiment of the inventive concept.

A change in a size and viewing angle of a reconstructed image according to a change in a numerical aperture will be described with reference to FIG. 4. The reconstructed image, for example, includes a two-dimensional text "HOLO". A resolution of the reconstructed image depends on the numerical aperture of the hologram display apparatus. Following Equation (1) describes a relation between an image resolution $R_{abbe}$ and a numerical aperture NA, where $\lambda$ denotes a wavelength of radiated coherent parallel light.

$$NA = \lambda/2R_{abbe} \qquad (1)$$

Following Equation (2) describes a relation between the numerical aperture NA and a viewing angle $\Omega_{NA}$, where N denotes the number of pixels of the spatial light modulator 30 in a u-axis direction, p denotes a pixel size, and z denotes a distance between the spatial light modulator 30 and a reconstructed image.

$$\Omega_{NA} = 2\sin^{-1}(NA) = 2\sin^{-1}(\lambda/2R_{abbe}) = 2\sin^{-1}(Np/2z) \qquad (2)$$

Equation (2) is expressed in terms of one dimension (u-axis) for convenience, but may be expanded to two dimension (plane formed by u-axis and v-axis). Furthermore, Equation (2) is an expression for a Fresnel diffraction regime, but may be expanded to a Rayleigh-Sommerfeld diffraction regime.

Referring to Equation (2), the viewing angle $\Omega_{NA}$ may increase as the numerical aperture NA increases. That is, an image may be reconstructed at the larger viewing angle $\Omega_{NA}$ as a reconstruction distance decreases. A reconstruction distance z is defined as the distance between the spatial light modulator 30 and the reconstructed image.

A first image 401, a second image 403, and a third image 405 of FIG. 4 may be respectively located at a first distance d1, a second distance d2, and a third distance d3 from the spatial light modulator 30, and may be respectively reconstructed at a first viewing angle $\Omega_1$, a second viewing angle $\Omega_2$, and a third viewing angle $\Omega_3$. The first viewing angle $\Omega_1$ of the first image 401 located at the first distance d1 from the spatial light modulator 30 may be larger than the second viewing angle $\Omega_2$ and the third viewing angle $\Omega_3$.

Figure 5:
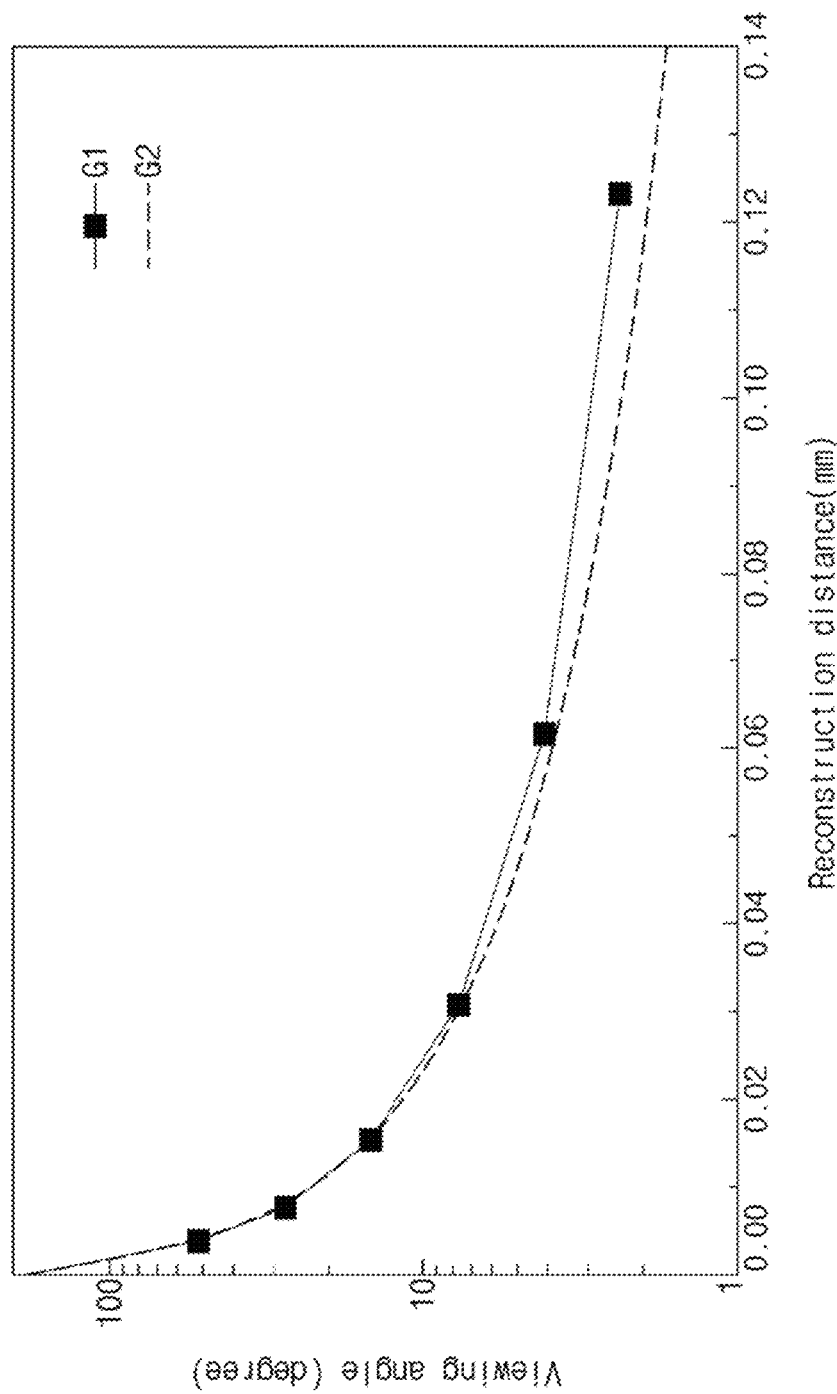
FIG. 5 is a graph for describing a relation between a reconstruction distance and a viewing angle in a digital hologram display apparatus according to an embodiment of the inventive concept.

FIG. 5 is a graph for describing a relation between a reconstruction distance and a viewing angle in a digital hologram display apparatus according to an embodiment of the inventive concept.

Referring to FIG. 5, the viewing angle of a reconstructed image may increase on a logarithmic scale as the reconstruction distance decreases. Results G1 of measuring the viewing angle relative to the reconstruction distance substantially match results G2 of numerical analytical simulation. The results G1 of measuring the viewing angle relative to the reconstruction distance, for example, indicate that a viewing angle of at least about 3 degrees is possible. The results G1 of measuring the viewing angle relative to the reconstruction distance indicate that a viewing angle of up to about 50 degrees is possible.

Figure 6:
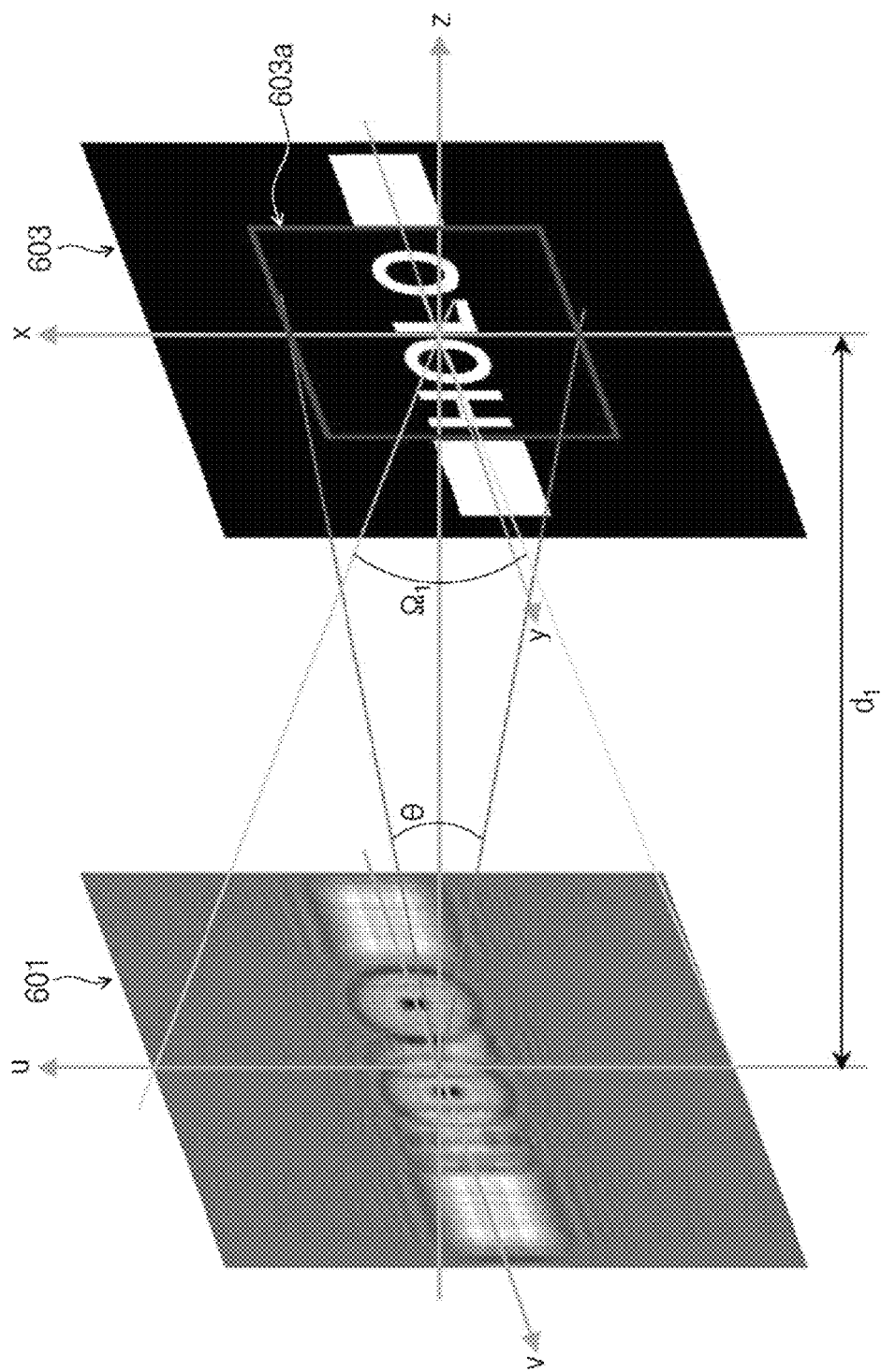
FIG. 6 is a conceptual diagram for describing a digital hologram generated using a digital hologram display apparatus according to an embodiment of the inventive concept.

FIG. 6 is a conceptual diagram for describing a digital hologram generated using a digital hologram display apparatus according to an embodiment of the inventive concept.

Referring to FIG. 6, the relation between the reconstruction distance and the size of the reconstructed image may be expressed as following Equation (3). In the graph of FIG. 6, the u-axis and the v-axis may define a plane on which a digital hologram is provided, the x-axis and the y-axis may define a plane on which an image is reconstructed, and the z-axis may be perpendicular to both the planes.

$$\Delta x^{-1} \geq 2 \frac{|x-u|_{max}}{\lambda \sqrt{(x-u)^2 + z^2}} \quad (3)$$

In Equation (3), the left-hand side is a reciprocal number of an object sampling interval $\Delta x$, the denominator of the right-hand side is a product of a wavelength $\lambda$ of radiated coherent parallel light and a hologram synthesis distance, and the numerator of the right-hand side is a maximum size of the reconstructed image. The x value of the right-hand side is determined by a product of the object sampling interval $\Delta x$ and the number N of pixels of the spatial light modulator 30 (see FIG. 2A) in the u-axis direction.

According to Equation (3), the maximum size of the reconstructed image may decrease if the reconstruction distance z decreases when the left-hand side is constant (i.e., when the object sampling interval $\Delta x$ is constant). Referring back to FIG. 4, the first image 401 located at the first distance d1 from the spatial light modulator 30 may be reconstructed with a smaller size than the second image 403 and the third image 405.

To overcome this limitation, the maximum size of the reconstructed image may be increased by reducing the object sampling interval $\Delta x$ when the hologram synthesis distance is constant. As a result, a digital hologram having a high numerical aperture and having a large-size reconstructed image may be generated without aliasing.

Comparing FIG. 6 with FIG. 4, a digital hologram expressed as a fringe pattern 601 may reconstruct a fourth image 603 at a position spaced the first distance d1 apart from the fringe pattern 601 in the z-axis direction. The fourth image 603 of FIG. 6 may maintain the first viewing angle $\Omega_1$, and the size of the fourth image 603 may be larger than the size of the first image 401 of FIG. 4.

A text region 603a of "HOLO" may be positioned in a partial region of the fourth image 603. The text region 603a of "HOLO" may be a region determined by a diffraction angle $\theta$ that depends on a pixel size of the spatial light modulator 30. The text region 603a of "HOLO" may have a smaller size than that of the fourth image 603.

Figure 7A:
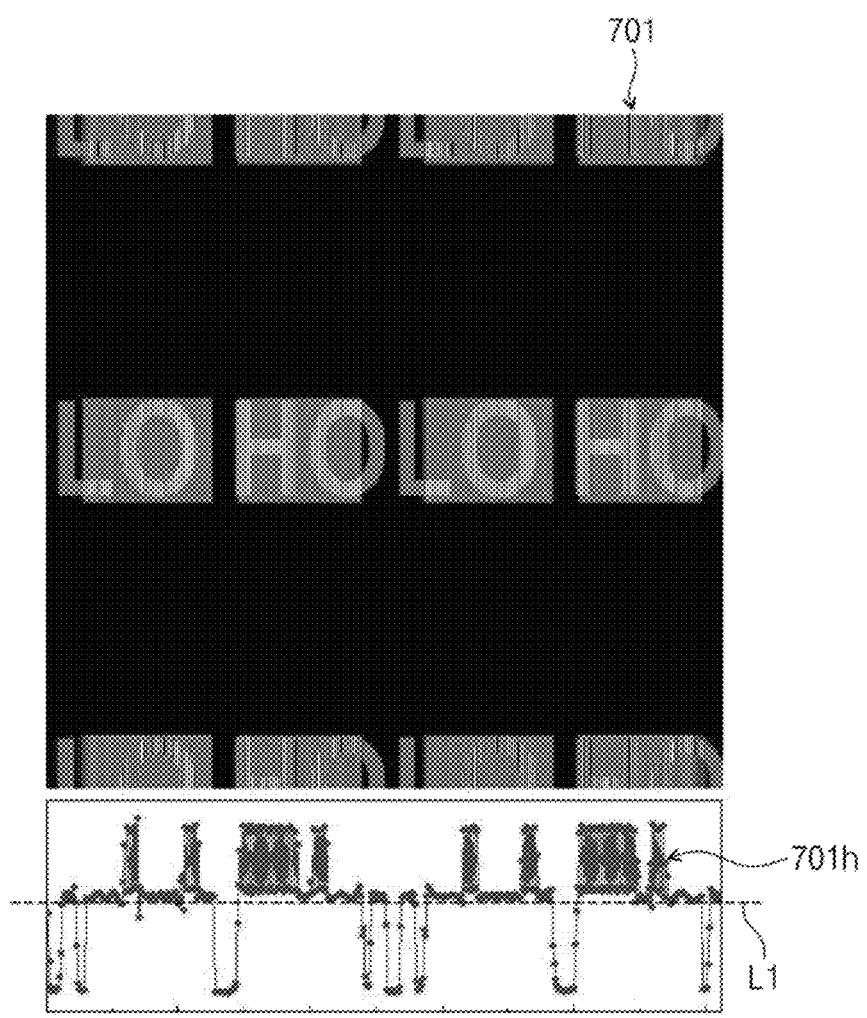
FIG. 7A is a diagram for describing an image reconstructed numerically.
Figure 7B:
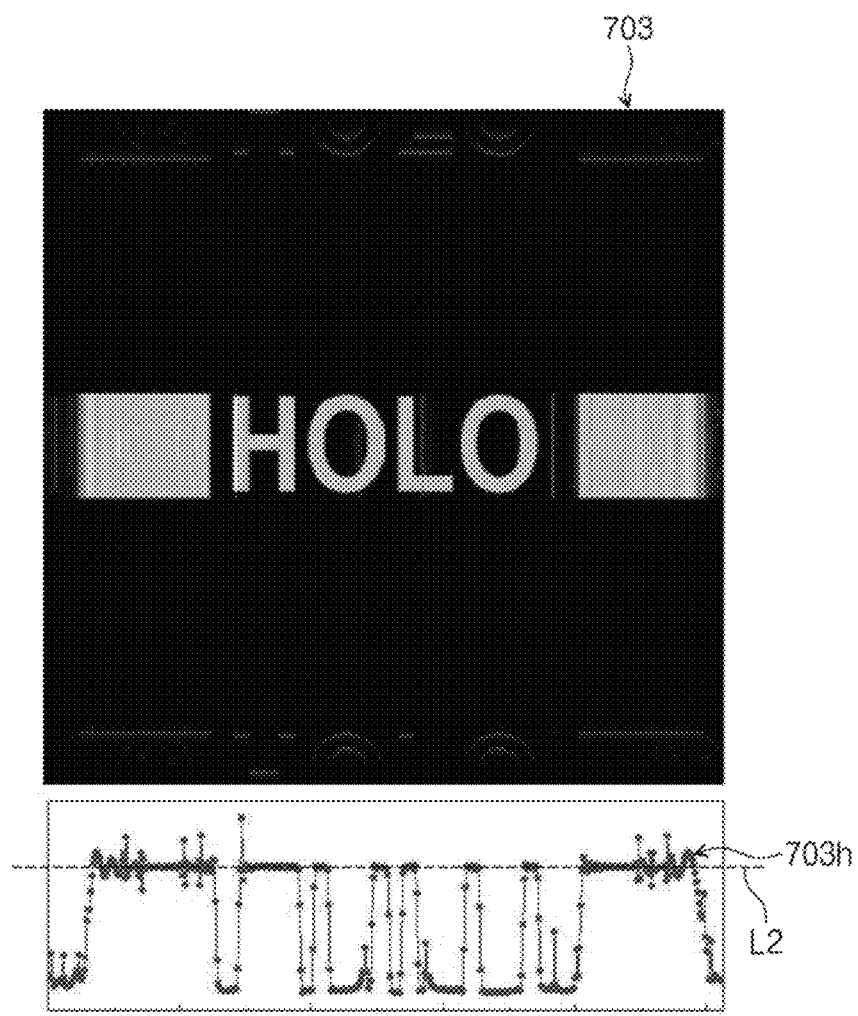
FIG. 7B is a diagram for describing an image reconstructed through up-sampling.

FIG. 7A is a diagram for describing an image reconstructed numerically, and FIG. 7B is a diagram for describing an image reconstructed through up-sampling.

Referring to FIG. 7A, an image 701 reconstructed numerically may include a high-order diffraction component 701h. The high-order diffraction component 701h may represent a portion that is above a first line L1 in a profile of the image 701 reconstructed numerically. The high-order diffraction component 701h may overlap a reconstructed object image. The high-order diffraction component 701h may occur since the diffraction angle $\theta$ (see FIG. 6) that depends on the pixel size of the spatial light modulator 30 (see FIG. 2A) is not sufficiently large.

On the contrary, referring to FIG. 7B, an image 703 reconstructed through up-sampling may include a high-order diffraction component 703h, but the high-order diffraction component 703h may be suppressed compared to the high-order diffraction component of FIG. 7A. The high-order diffraction component 703h may represent a portion that is above a second line L2 in a profile of the image 703 reconstructed through up-sampling. It may be recognized from the profile that the high-order diffraction component 703h is suppressed compared to the high-order diffraction component of FIG. 7A. Up-sampling may be performed through the noise image removal unit 40 (see FIG. 2A) having a smaller pixel pitch than that of the spatial light modulator 30 (see FIG. 2A).

However, an embodiment of the inventive concept is not limited thereto, and, thus, the high-order diffraction components 701h and 703h may be suppressed by modifying a design of the spatial light modulator 30 (see FIG. 2A) without using the noise image removal unit 40 (see FIG. 2A). For example, the modified design of the spatial light modulator 30 (see FIG. 2A) may have an aperiodic pixel structure.

Figure 8:
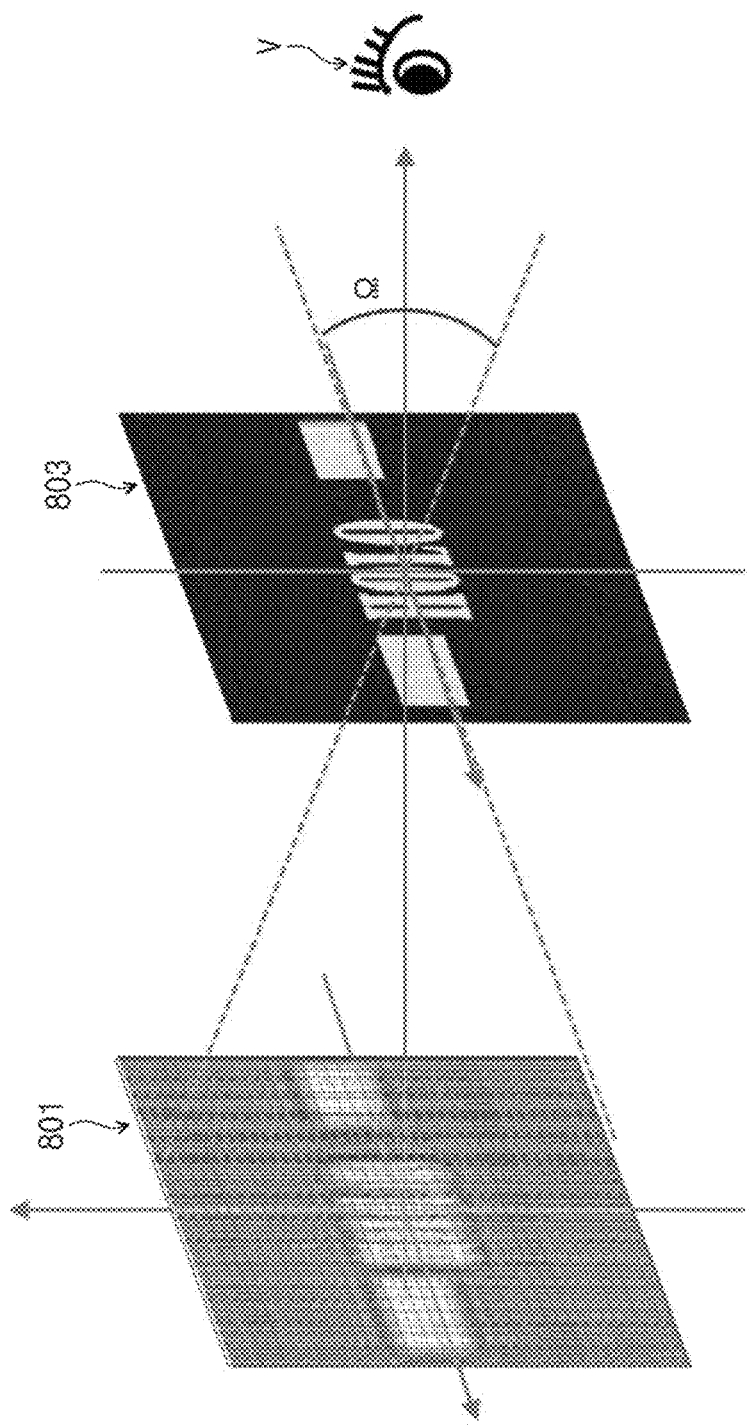
FIG. 8 is a conceptual diagram for describing a holographic image reconstructed by using a digital hologram display apparatus according to an embodiment of the inventive concept.

FIG. 8 is a conceptual diagram for describing a holographic image reconstructed by using a digital hologram display apparatus according to an embodiment of the inventive concept.

Referring to FIG. 8, a digital hologram 801 may be reconstructed through the spatial light modulator 30 (see FIG. 1 and FIG. 2A) and the noise image removal unit 40 (see FIG. 1 and FIG. 2A). A reconstructed image 803 reconstructed through the digital hologram 801 may exhibit improved image quality without aliasing. The reconstructed image 803 may have improved image quality and a sufficient size and may widen a viewing angle through the inventive concept. As a result, the viewer V may view the reconstructed image 803 having a sufficient size at a wide viewing angle $\Omega$ through the digital hologram 801.

A digital hologram display apparatus according to an embodiment of the inventive concept may display a digital holographic image having a sufficiently large size and a wide viewing angle with improved image quality.

Furthermore, a method of displaying a holographic image according to an embodiment of the inventive concept may suppress a noise image without reducing a size of an image while widening a viewing angle.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A method of displaying a digital holographic image, comprising:
    generating and converting a digital hologram with a numerical aperture having a quantity larger than a sine value of a diffraction angle of pixels of a spatial light modulator;
    recording the digital hologram in the spatial light modulator;
    radiating coherent parallel light to the spatial light modulator;
    removing an aliasing noise image generated due to a periodicity of the pixels of the spatial light modulator, a sampling rate of the spatial light modulator, or both; and
    implementing a reconstructed image reconstructed by the spatial light modulator.

2. The method of claim 1,
wherein the generating and converting of the digital hologram comprises calculating the digital hologram to be recorded in the spatial light modulator,
wherein the calculating is performed by using Riemann integral of Rayleigh-Sommerfeld formula, Fresnel formula based on Fourier transformation, or Fourier hologram synthesis formula.

3. The method of claim 2,
wherein the calculating is performed by using the Fresnel formula based on Fourier transformation,
wherein the generating and converting of the digital hologram further comprises performing down-sampling.

4. The method of claim 1, wherein the generating and converting of the digital hologram is performed so as to satisfy a Nyquist-Shannon sampling theorem.

5. The method of claim 4,
wherein the generating and converting of the digital hologram is performed by reducing an object sampling interval while satisfying the Nyquist-Shannon sampling theorem,
wherein a size of the reconstructed image is increased through the reducing of the object sampling interval.

6. The method of claim 1, further comprising modulating, by the spatial light modulator, the coherent parallel light using a complex-amplitude modulation scheme, an amplitude modulation scheme, or a phase modulation scheme.

7. The method of claim 1,
wherein a noise image removal unit is provided on the spatial light modulator,
wherein the noise image removal unit comprises a plurality of subpixels configured to remove the aliasing noise image, and
wherein the removing of the aliasing noise image is performed by removing a high-order diffraction component through the subpixels.

8. The method of claim 1,
wherein the spatial light modulator has an aperiodic pixel structure, and
wherein the removing of the aliasing noise image is performed by the spatial light modulator.

9. The method of claim 1, wherein a viewing angle of the reconstructed image is about 10 degrees to about 90 degrees.

10. A digital hologram display apparatus comprising:
a digital hologram generation/conversion unit configured to generate and convert a digital hologram;
a backlight unit configured to generate coherent parallel light;
a spatial light modulator comprising a plurality of pixels configured to record the digital hologram as an electric signal and reconstruct the digital hologram;
a noise image removal unit provided on the spatial light modulator and comprising a plurality of subpixels configured to remove an aliasing noise image; and
an output optical system configured to implement a reconstructed image reconstructed by the spatial light modulator,
wherein the coherent parallel light generated by the backlight unit is radiated to the spatial light modulator,
wherein the aliasing noise image is due to a periodicity of the plurality of pixels of the spatial light modulator, a sampling rate of the spatial light modulator, or both, and
wherein the digital hologram has a numerical aperture having a quantity larger than a sine value of a diffraction angle of the pixels of the spatial light modulator.

11. The digital hologram display apparatus of claim 10, wherein the backlight unit comprises red, green, and blue lasers or red, green, and blue light-emitting diodes.

12. The digital hologram display apparatus of claim 10, wherein the digital hologram generation/conversion unit generates and converts the digital hologram so as to satisfy a Nyquist-Shannon sampling theorem.

13. The digital hologram display apparatus of claim 10, wherein the digital hologram is generated in a Fresnel diffraction regime or Rayleigh-Sommerfeld diffraction regime.

14. The digital hologram display apparatus of claim 10,
wherein the pixels and the subpixels have a square shape, a circular shape, a rectangular shape, a polygonal shape, and/or an irregular shape, and
wherein a second pitch of the subpixels is equal to or smaller than a first pitch of the pixels.

15. The digital hologram display apparatus of claim 10, wherein the spatial light modulator is configured to modulate the coherent parallel light using a complex-amplitude modulation scheme, an amplitude modulation scheme, or a phase modulation scheme.

16. The digital hologram display apparatus of claim 10, wherein the noise image removal unit is a binary amplitude mask.

17. The digital hologram display apparatus of claim 16, wherein the binary amplitude mask has a random distribution.

18. The digital hologram display apparatus of claim 10, wherein the noise image removal unit is attached to the spatial light modulator without a separation distance therebetween.

19. The digital hologram display apparatus of claim 10, further comprising a Fourier lens provided between the noise image removal unit and the output optical system.

20. The digital hologram display apparatus of claim 10, wherein a viewing angle of the reconstructed image is about 10 degrees to about 90 degrees.

* * * * *